US011226993B2

(12) United States Patent
Zhou et al.

(10) Patent No.: US 11,226,993 B2
(45) Date of Patent: Jan. 18, 2022

(54) METHOD AND APPARATUS FOR CLUSTERING DATA STREAM

(71) Applicant: ADVANCED NEW TECHNOLOGIES CO., LTD., Grand Cayman (KY)

(72) Inventors: Jun Zhou, Hangzhou (CN); Xiaolong Li, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 94 days.

(21) Appl. No.: 16/684,831

(22) Filed: Nov. 15, 2019

(65) Prior Publication Data

US 2020/0081905 A1 Mar. 12, 2020

Related U.S. Application Data

(63) Continuation of application No. PCT/CN2018/088948, filed on May 30, 2018.

(30) Foreign Application Priority Data

May 31, 2017 (CN) .......................... 201710400902.8

(51) Int. Cl.
*G06F 16/28* (2019.01)
*G06F 16/2455* (2019.01)
(Continued)

(52) U.S. Cl.
CPC .......... *G06F 16/285* (2019.01); *G06F 16/212* (2019.01); *G06F 16/2477* (2019.01);
(Continued)

(58) Field of Classification Search
CPC ............ G06F 16/285; G06F 16/24568; G06F 16/2477; G06F 16/212; G06F 16/278; G06N 7/005
(Continued)

(56) References Cited

U.S. PATENT DOCUMENTS 6,636,862 B2  10/2003  Lundahl et al.
6,687,696 B2   2/2004  Hofmann et al.
(Continued)

FOREIGN PATENT DOCUMENTS

CN   103353883 A   10/2013
CN   103577602 A    2/2014
(Continued)

OTHER PUBLICATIONS

Written Opinion for Singaporean Application No. 11201910767P dated Jan. 5, 2021.
(Continued)

*Primary Examiner* — Evan Aspinwall

(57) ABSTRACT

Provided is a method for clustering a data stream. The method comprises: acquiring a plurality of resulting models of a plurality of preceding data partitions prior to a current data partition in a data stream, wherein data partitions in the data stream have a temporal relationship, and wherein each of the plurality of resulting models is generated according to a clustering result of a corresponding preceding data partition, and each of the plurality of resulting models comprises one or more representative parameters in different categories; determining a starting model of the current data partition according to the plurality of resulting models, wherein the starting model comprises one or more representative parameters in different categories determined based on representative parameters of the same category in the plurality
(Continued)

of resulting models; and clustering data records in the current data partition by using the starting model.

14 Claims, 4 Drawing Sheets

(51) Int. Cl.
  *G06F 16/2458* (2019.01)
  *G06F 16/21* (2019.01)
  *G06F 16/27* (2019.01)
  *G06N 7/00* (2006.01)
(52) U.S. Cl.
  CPC ...... *G06F 16/24568* (2019.01); *G06F 16/278* (2019.01); *G06N 7/005* (2013.01)
(58) Field of Classification Search
  USPC .......................................................... 707/740
  See application file for complete search history.

(56) References Cited

U.S. PATENT DOCUMENTS

| | | | |
|---|---|---|---|
| 6,917,839 | B2 | 7/2005 | Bickford |
| 8,069,190 | B2 | 11/2011 | McColl et al. |
| 8,170,984 | B2 | 5/2012 | Bakalash et al. |
| 8,392,418 | B2 | 3/2013 | Birdwell et al. |
| 8,595,234 | B2 | 11/2013 | Siripurapu et al. |
| 8,661,251 | B2 | 2/2014 | Prouff et al. |
| 9,244,978 | B2 | 1/2016 | Alves et al. |
| 9,607,023 | B1 | 3/2017 | Swamy |
| 9,693,086 | B2 | 6/2017 | Kouritzin et al. |
| 9,767,427 | B2 | 9/2017 | Liu et al. |
| 9,886,486 | B2 | 2/2018 | de Castro Alves et al. |
| 2007/0022065 | A1 | 1/2007 | Hatano et al. |
| 2008/0031587 | A1 | 2/2008 | Chen et al. |
| 2010/0153395 | A1 | 6/2010 | Hannuksela et al. |
| 2013/0103624 | A1 | 4/2013 | Thieberger |
| 2013/0138598 | A1 | 5/2013 | Shao |
| 2014/0310285 | A1 | 10/2014 | Chan et al. |
| 2016/0071027 | A1* | 3/2016 | Brand .................... H04L 45/08 706/12 |
| 2016/0364420 | A1 | 12/2016 | Cronin et al. |
| 2016/0379134 | A1 | 12/2016 | Kochut et al. |
| 2018/0197089 | A1* | 7/2018 | Krasser .................. G06F 21/56 |

FOREIGN PATENT DOCUMENTS

| | | |
|---|---|---|
| CN | 105468669 A | 4/2016 |
| CN | 107392220 A | 11/2017 |
| EP | 3159809 A1 | 4/2017 |
| JP | 2017-517775 A | 6/2017 |
| JP | 2019-057286 A | 4/2019 |
| TW | 200809603 A | 2/2008 |
| TW | 201009701 A | 3/2010 |
| TW | 201517607 A | 5/2015 |

OTHER PUBLICATIONS

Search Report for European Application No. 18808698.7 dated Apr. 1, 2020.
PCT International Search Report and the Written Opinion dated Aug. 9, 2018, issued in related International Application No. PCT/CN2018/088948, with English translation (14 pages).
PCT International Preliminary Report on Patentability dated Dec. 12, 2019, issued in related International Application No. PCT/CN2018/088948, with English translation (12 pages).
Supplementary Search Report dated Apr. 1, 2020, issued in related European Application No. 18808698.7 (3 pages).
First Office Action dated Jun. 25, 2019, issued in related Chinese Application No. 201710400902.8, with English machine translation (10 pages).
Second Office Action dated Jan. 10, 2020, issued in related Chinese Application No. 201710400902.8, with English machine translation (10 pages).
First Search dated Feb. 23, 2020, issued in related Chinese Application No. 201710400902.8 (1 page).
Third Office Action dated Mar. 3, 2020, issued in related Chinese Application No. 201710400902.8, with English machine translation (10 pages).
Search Report dated Mar. 27, 2019, issued in related Taiwan Application No. 107108413 (1 page).

* cited by examiner

METHOD AND APPARATUS FOR CLUSTERING DATA STREAM

CROSS-REFERENCE TO RELATED APPLICATIONS

The present application is a continuation application of International Patent Application No. PCT/CN2018/088948, filed on May 30, 2018, which is based on and claims priority to the Chinese Patent Application No. 201710400902.8, filed on May 31, 2017 and entitled "Method and Apparatus for Clustering Data Stream." The above-referenced applications are incorporated herein by reference in their entirety.

TECHNICAL FIELD

The specification relates to the field of data processing technologies, particularly to a method and an apparatus for clustering a data stream.

BACKGROUND

With the development and popularization of the Internet, various network-based activities are constantly generating data. The constantly generated data forms data streams. Finding meaningful patterns or rules from a data stream as soon as possible and providing near-real-time support for business decision-making and business process control become important ways to utilize the data.

As a common data mining method, clustering is widely used in user classification, text analysis, and other applications. Clustering divides a data set (also referred to as a point set, where each point of which is a data record) into multiple categories according to inherent similarities among the data records, so that the similarity of points in one category is relatively large, while the similarity of points in different categories is relatively small.

An existing method for clustering a data stream is as follows: a segment of data is extracted from a data stream generated by a system according to a rule (such as a tapering time window, a sliding window, etc.). A data set formed by the segment of data is clustered by some clustering algorithm. Then a next segment of data is extracted according to the same rule, and the same clustering algorithm is used to cluster a data set formed by the next segment of data. Since each segment of data reflects a business situation in a different period, and the business situation tends to change temporarily, the clustering results obtained by clustering all data segments will greatly change accordingly, resulting in severe jitters of the clustering results. Therefore, the business carried out according to the clustering results tends to jump, which affects the stability and effect of the business.

SUMMARY

In light of the above, the specification provides a method for clustering a data stream. The method may comprise: acquiring a plurality of resulting models of a plurality of preceding data partitions prior to a current data partition in a data stream, wherein data partitions in the data stream have a temporal relationship, and wherein each of the plurality of resulting models is generated according to a clustering result of a corresponding preceding data partition, and each of the plurality of resulting models comprises one or more representative parameters in different categories; determining a starting model of the current data partition according to the plurality of resulting models, wherein the starting model comprises one or more representative parameters in different categories determined based on representative parameters of the same category in the plurality of resulting models; and clustering data records in the current data partition by using the starting model.

In some embodiments, determining a starting model of the current data partition according to the plurality of resulting models comprises: determining each of the one or more representative parameters of the category in the starting model based on a weighted sum of the representative parameters of the same category in the plurality of resulting models.

In some embodiments, the method may further comprise: determining a weight of one of the representative parameters of the same category in the plurality of resulting models based on a time interval between a preceding data partition corresponding to a resulting model to which the representative parameter belongs and the current data partition, wherein the smaller the time interval is, the higher the weight is.

In some embodiments, the method may further comprise: generating a resulting model of the current data partition according to a clustering result of the current data partition, for clustering a subsequent data partition in the data stream.

In some embodiments, clustering data records in the current data partition by using the starting model comprises: clustering data records in the current data partition by using the starting model based on a k-means clustering algorithm, wherein the one or more representative parameters of the category in the starting model comprise a location of a central point of the category.

In some embodiments, clustering data records in the current data partition by using the starting model comprises: clustering data records in the current data partition by using the starting model based on a Gaussian mixture model clustering algorithm, wherein the one or more representative parameters of the category of the starting model comprise a mean and standard deviation of the category.

In some embodiments, determining a starting model of the current data partition according to the plurality of resulting models comprises: taking each category included in the plurality of resulting models as a category in the starting model.

In some embodiments, determining a starting model of the current data partition according to the plurality of resulting models further comprises: deleting a category from the starting model of the current data partition in response to that a clustering result with respect to a category in at least one of the plurality of preceding data partitions satisfies a predetermined deletion condition.

In some embodiments, clustering data records in the current data partition by using the starting model comprises: clustering data records in the current data partition by using the starting model based on a clustering algorithm with a non-fixed number of categories.

The specification further provides an apparatus for clustering a data stream. The apparatus comprises: one or more processors and one or more non-transitory computer-readable memories coupled to the one or more processors and configured with instructions executable by the one or more processors to cause the apparatus to perform operations comprising: acquiring a plurality of resulting models of a plurality of preceding data partitions prior to a current data partition in a data stream, wherein data partitions in the data stream have a temporal relationship, and wherein each of the plurality of resulting models is generated according to a clustering result of a corresponding preceding data partition, and each of the plurality of resulting models comprises one or more representative parameters in different categories; determining a starting model of the current data partition according to the plurality of resulting models, wherein the starting model comprises one or more representative parameters in different categories determined based on representative parameters of the same category in the plurality of resulting models; and clustering data records in the current data partition by using the starting model.

The specification further provides a non-transitory computer-readable storage medium configured with instructions. The instructions are executable by one or more processors to cause the one or more processors to perform operations comprising: acquiring a plurality of resulting models of a plurality of preceding data partitions prior to a current data partition in a data stream, wherein data partitions in the data stream have a temporal relationship, and wherein each of the plurality of resulting models is generated according to a clustering result of a corresponding preceding data partition, and each of the plurality of resulting models comprises one or more representative parameters in different categories; determining a starting model of the current data partition according to the plurality of resulting models, wherein the starting model comprises one or more representative parameters in different categories determined based on representative parameters of the same category in the plurality of resulting models; and clustering data records in the current data partition by using the starting model.

According to the above embodiments of the specification, the starting model of the current data partition in a data stream is determined according to the resulting models of at least two preceding data partitions prior to the current data partition, and the category in the starting model is used as a starting point to cluster the current data partition, so that the historical data of the preceding data partition can affect the clustering of the current data partition. The embodiments of the specification enable a clustering result of a current data partition to have both long-term efficacy and timeliness, thus preventing severe jitters of the clustering result, and improving the stability of a business associated with the data stream while providing support to timeliness of the business.

DETAILED DESCRIPTION

Figure 1:
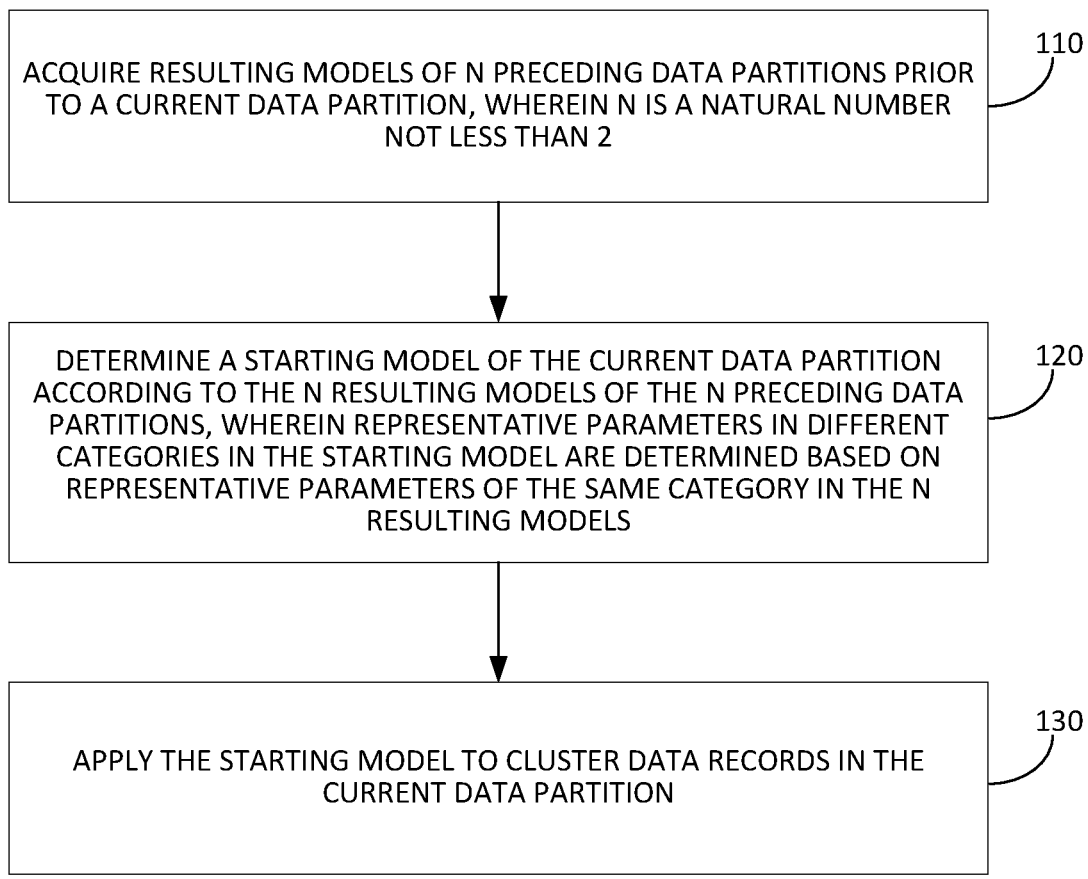
FIG. 1 is a flow chart of a method for clustering a data stream according to some embodiments of the specification.

In a clustering analysis, the division of each category formed by a point set in a clustering process can correspond to a clustering model, including an initial value of a category division when some clustering algorithms are started, a category division during an iterative process of the clustering algorithms, and a category division as a clustering result. The abstract representation of each category is recorded in a clustering model. The abstract representation of the category is determined by all the points belonging to the category. The abstract expression of the category is used in a clustering algorithm to calculate a degree of similarity between the points and the categories and/or a degree of similarity among the categories, thereby determining an attribution relationship between the points and the categories and a division relationship between the categories.

The abstract representation of the category may be constructed by two parts: a representation form and a representative parameter. The representation form of the category is determined by the clustering algorithm used. For example, in the Gaussian Mixture Model (GMM) clustering algorithm, the representation form of a category is a type of Gaussian distribution. The representation form of a category in the k-means clustering algorithm is the central point of the category. Since all the categories in a clustering model use the same representation, and the difference among the categories is in that they have different representative parameters; therefore, the representative parameter of each category can uniquely identify a category. Similarly, the representative parameter also determines the degree of similarity between the points in the point set and the category to which the representative parameter belongs, and the degree of similarity between the category to which the representative parameter belongs and other categories. In the iterative process of a clustering algorithm, the representative parameter may change with an increase of the number of the points in the category to which the points belong.

In some embodiments, a category may include multiple representative parameters. The number and forms of the representative parameters are related to the clustering algorithm adopted. Still taking the clustering of data streams by the GMM and k-means clustering algorithms as examples, a representative parameter of a category in the GMM clustering algorithm may be the mean and standard deviation of the category, while a representative parameter of a category in the k-means clustering algorithm may be the location of the central point of the category (such as a coordinate point in a K-dimensional space, where K is a natural number).

A clustering model generated in a clustering process of a first point set can be used to cluster a second point set having the same or similar data intrinsic property, in which situation the clustering result of the second point set not only depends on the distribution of data in the second set of points, but also is affected by the distribution of data in the first point set. For example, a resulting model of the first point set (e.g., a clustering model generated according to a clustering result of a point set is referred to as a resulting model of the point set in the specification) can be used as a starting model of the second point set having a similar data intrinsic property (e.g., when a point set is to be clustered, a clustering model used to determine an initial value of a category in the clustering algorithm is referred to as a starting model of the point set in the specification). This may be equivalent to the clustering of the union of the first point set and the second point set, and the data distribution of the first point set can be fully reflected in the clustering result of the second point set.

When a data stream is being clustered, since the points in the data stream are generated successively with time, point sets, as clustering objects, are segments of the data stream respectively corresponding to different time periods, which are referred to as data partitions in the specification, each data partition being a point set. Since the points in the data stream are usually from the same business system or even from the same business process, the points in the data partitions corresponding to different time periods often have a similar intrinsic data property. Therefore, the clustering models, generated in a clustering process based on the data partitions corresponding the preceding time periods, can be borrowed to cluster the current data partition. In this way, the clustering result of the current data partition can reflect the data distribution characteristics of the preceding data partitions, thereby bringing the continuity of the business into the clustering of the current data partition. Accordingly, the clustering results can change smoothly with time, preventing severe jitters of the clustering results.

In light of the above, the embodiments of the specification provide a method for clustering a data stream. In the method, representative parameters of the same category in a starting model of the current data partition are generated according to representative parameters of each category in resulting models of at least two preceding data partitions, so as to determine the starting model of the current data partition. The starting model is used to cluster the current data partition, so that the historical data of the preceding data partitions can affect the clustering of the current data partition, thereby not only enabling the clustering result of the current data partition to have the long-term data characteristics in a long time window, but also capturing the short-term data changes in the current time period. Accordingly, severe jitters of the clustering results due to the short-term data changes can be prevented, solving the problems in existing clustering methods.

The embodiments of the specification can be implemented on any computing and storage device, such as a mobile phone, a tablet, a personal computer (PC), a notebook, a server. Alternatively, the various functions in the embodiments of the specification can be implemented by logical nodes operated by two or more devices.

In the embodiments of the specification, the flow of the method for clustering a data stream can be shown in FIG. 1.

Step 110, acquiring resulting models of N preceding data partitions prior to the current data partition, wherein N is a natural number not less than 2.

Figure 2:
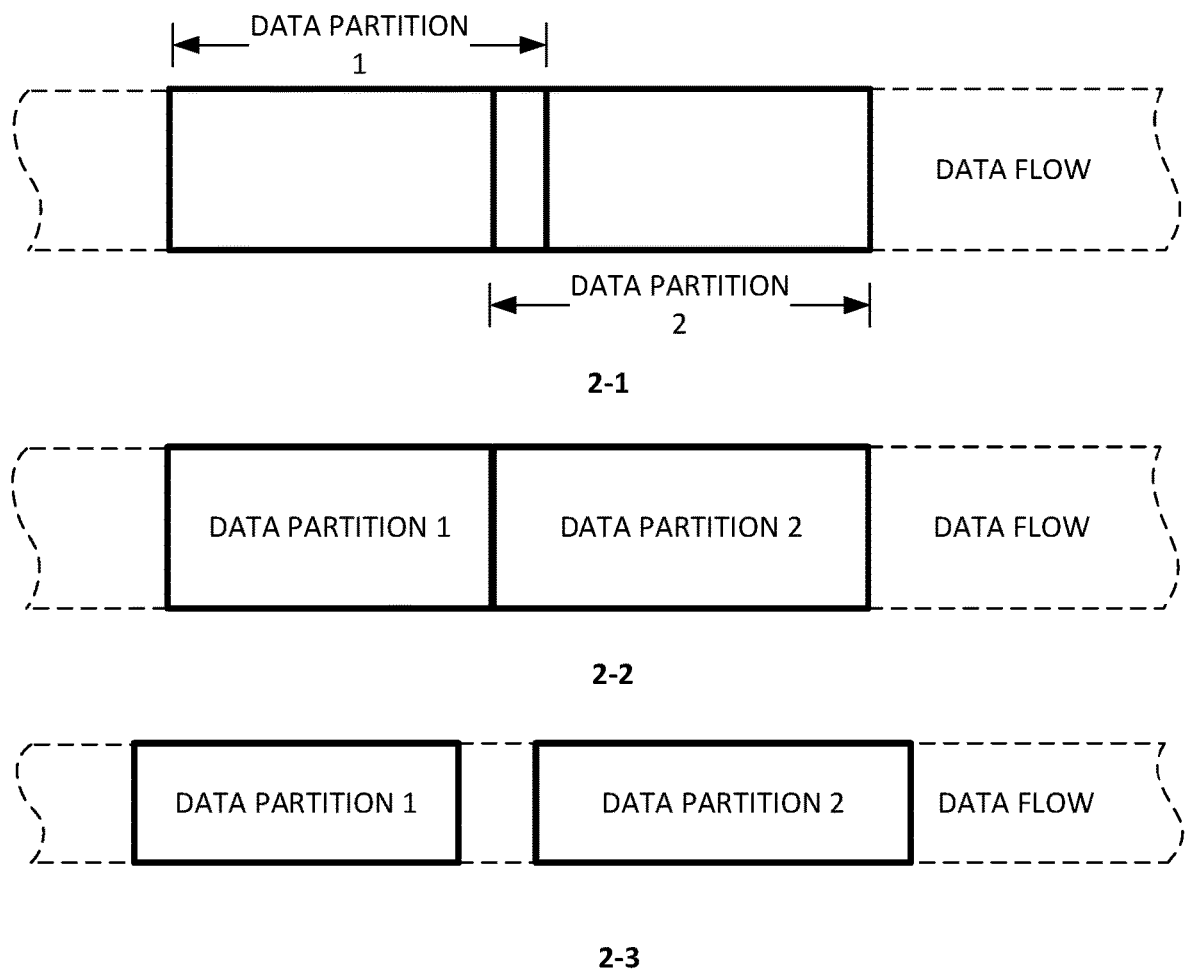
FIG. 2 is a schematic diagram of three manners of extracting data partitions in a data stream according to some embodiments of the specification.

In some embodiments, the data stream comprises a plurality of data partitions having a temporal relationship, and each data partition is a segment of data obtained from the data stream based on a time window. The time windows of two temporally adjacent data partitions can be partially overlapping. For example, some data belongs to both of the two data partitions, as shown in FIG. 2 and labeled as 2-1. In another example, the time windows of two temporally adjacent data partitions can be adjacent, e.g., the data stream is divided into separate data partitions, as shown in FIG. 2 and labeled as 2-2. In still another example, the time windows of two temporally adjacent data partitions can be spaced, e.g., some data in the data stream does not belong to any of the two data partitions, as shown in FIG. 2 and labeled as 2-3. Other ways of partitioning the data stream may be used. In addition, the lengths of the time windows of the data partitions may be the same or different, and the numbers of the points included in the data partitions may be the same or different.

The current data partition is the data partition to be clustered, and a preceding data partition is a data partition which has been clustered and is prior to the current data partition in the time sequence. A resulting model of each preceding data partition is generated from a clustering result of the corresponding preceding data partition. The resulting model of a data partition may include representative parameters for each category when the clustering is completed for the data partition.

In some embodiments, the resulting model of each data partition can be generated at the end of the clustering of the data partition, and the resulting model can be stored, so that the stored resulting model of the each preceding data partition can be read in this step 110.

Returning to FIG. 1, Step 120, determining a starting model of the current data partition according to the N resulting models of the N preceding data partitions, wherein representative parameters in different categories in the starting model are determined based on representative parameters of the same category in the N resulting models.

The manner of generating the starting model of the current data partition from the N resulting models may be determined based on the type of the clustering algorithm, the business change speed of the data stream, or other factors. The following two application scenarios are taken as examples for description.

In the first application scenario, the clustering algorithm used for data stream clustering is a clustering algorithm with a fixed number of categories. The clustering algorithm with a fixed number of categories has a set number of categories, and each resulting model has the same M (M is a natural number greater than or equal to 2) categories. In some embodiments, the same category may have different representative parameters in different resulting models. The starting model of the current data partition also has the same M categories as in the resulting models, and the representative parameters of each category in the N resulting models are used to calculate the representative parameters of the category in the starting model according to a predetermined fusion algorithm, so as to determine the starting model.

For example, a representative parameter of the category in the starting model can be determined by a weighted sum of the same representative parameters of the same category in the resulting models of the N online data partitions. In some embodiments, the weight of a representative parameter of the same category in the resulting models may be set to be related to the time interval between the preceding data partition corresponding to the resulting model to which the representative parameter belongs and the current data partition. For example, the smaller the time interval is, the higher the weight is. In this way, by using the representative parameters of the N resulting models, the clustering results of the corresponding time periods can be reflected in the clustering of the current data partition, not only representing the long-term influence of the historical data, but also emphasizing the data distribution of the adjacent time periods to fully reflect short-term data changes.

In an example of the first application scenario, the clustering of the data stream uses the k-means algorithm, and the fixed number of the categories is M. In the k-means algorithm, a representative parameter of a category may be the location of the central point of the category. The starting model of the current data partition can be determined by Equation 1:

$$D_t = \Sigma_{i=1}^{N} \omega_i D_{i,t}^{pre}, \forall t \in [1, M] \quad \text{Equation 1}$$

In Equation 1, $D_t$ is the central point location of the t-th category in the starting model of the current data partition, and $D_{i,t}^{pre}$ is the central point location of the t-th category in the resulting model of the i-th preceding data partition, and a is the weight of the resulting model of the i-th preceding data partition.

In the second application scenario, the clustering algorithm used for clustering a data stream is a clustering algorithm with a non-fixed number of categories. The clustering algorithm with a non-fixed number of categories determines how many categories the point set is divided into according to the distribution of points in the point set, such as the Density-Based Spatial Clustering of Applications with Noise (DBSCAN) algorithm. In some embodiments, the resulting models of N preceding data partitions may include different categories. When a starting model is to be determined for the current data partition, each category included in the N resulting models may be taken as a category in the starting model of the current data partition (i.e., the set of categories in the starting model is the union of the sets of the categories in the N resulting models), and then the representative parameters of each category in the resulting models are used to calculate the representative parameters of the category in the starting model according to a predetermined fusion algorithm, to determine the starting model.

The predetermined fusion algorithm in the second application scenario may be implemented by referring to the first application scenario, e.g., using a weighted sum calculation method. Since a new category may be generated in the clustering process, in the second application, there may be a category in a starting model which only exists in P (P is a natural number smaller than N) resulting models. In this situation, the predetermined fusion algorithm may calculate the representative parameters of the category in the starting model according to the representative parameters of the category in the P resulting models.

Similarly, in the clustering process of the second application scenario, some categories may be no longer suitable for the current data distribution with time. The clustering results of the preceding data partitions can be monitored. When the clustering result of a category in at least one preceding data partition satisfies a predetermined deletion condition, the category is deleted from the starting model of the current data partition. The predetermined deletion condition may be set according to factors such as the speed and degree of data changes in the application. For example, the predetermined deletion condition may be set that in the clustering results of consecutive P preceding data partitions, the number of points belonging to the category is less than a percentage threshold of the total number of points.

In some embodiments, for the businesses processed according to the clustering results, when the processing of the businesses belonging to some categories in different resulting models is consistent, these categories are referred to as the same category in the different resulting models. In some embodiments, when the procedures of the businesses belonging to some categories in different resulting models are consistent, these categories are referred to as the same category in the different resulting models. In other words, for the purpose of a clustering analysis, these categories belonging to different resulting models can be considered to be the same category. The way to determine which categories in the different resulting models are the same category can be determined according to the characteristics of the application scenarios. For example, in the first application scenario described above, the first N resulting models (i.e., the resulting models of the first to the N-th data partitions in the data stream) can be used as a starting model to cluster the point sets in which the points have been marked with categories. The categories of points marked with the same category in the N clustering results are the same category. In another example, in the second application scenario described above, the same category in the first N resulting models can be manually labeled. In still another example, for the first application scenario, the distances between a category a in the first resulting model and M categories in the second resulting model can be calculated respectively, and the category in the second resulting model having the nearest distance to the category a is determined to be the same as Category a; similarly, all the same categories can be obtained.

Step 130, applying the starting model to cluster data records in the current data partition.

After the starting model of the current data partition is determined, the categories in the starting model are used as initial values to apply the clustering algorithm on the current data partition, and the points in the current data partition are clustered.

After the execution of the clustering algorithm is completed, the clustering result of the current data partition is obtained. The resulting model of the current data partition can be generated according to the clustering result of the current data partition, so as to be used for clustering the subsequent data partitions.

In some embodiments, when the first to N-th data partitions are current data partitions to be clustered, the numbers of their respective preceding data partitions are less than N. Thus, the first to N-th data partitions may be clustered according to the existing clustering techniques, and the clustering model generated by the N clustering results is used as the basis of the starting model of the (N+1)-th data partition. The clustering result of the first data partition can be obtained according to the existing clustering techniques, and then the resulting models of the first to the (L−1)-th (L is any natural number greater than or equal to 2 and less than N) data partitions determine the starting model of the L-th data partition. In some embodiments, the first to the N-th data partitions may be clustered in other manners.

In some embodiments, the representative parameters of the same categories in the starting model of the current data partition are generated according to the representative parameters of the categories in the resulting models of the preceding N data partitions, so that the starting model of the current data partition is determined, and the categories in the starting model are used as a starting point to cluster the current data partition. Therefore, the historical data of the preceding data partition can affect the clustering of the current data partition, which not only can reflect the long-term data characteristics in a long time window in the clustering results of the current data partition, but also timely reflect the short-term data changes in the current time period. Accordingly, severe jitters of the clustering result can be prevented, and the stability of a business associated with the data stream can be improved, while providing support to timeliness of the business.

In some embodiments, the data stream is clustered by using a GMM clustering algorithm. The streaming data from the business system is divided into multiple data partitions according to the time segment set by the user (for example, data generated every 10 minutes is stored as one data partition) and stored in a chronological order. The stored data partition can be deleted according to the aging time set by the user, to save the storage space.

Figure 3:
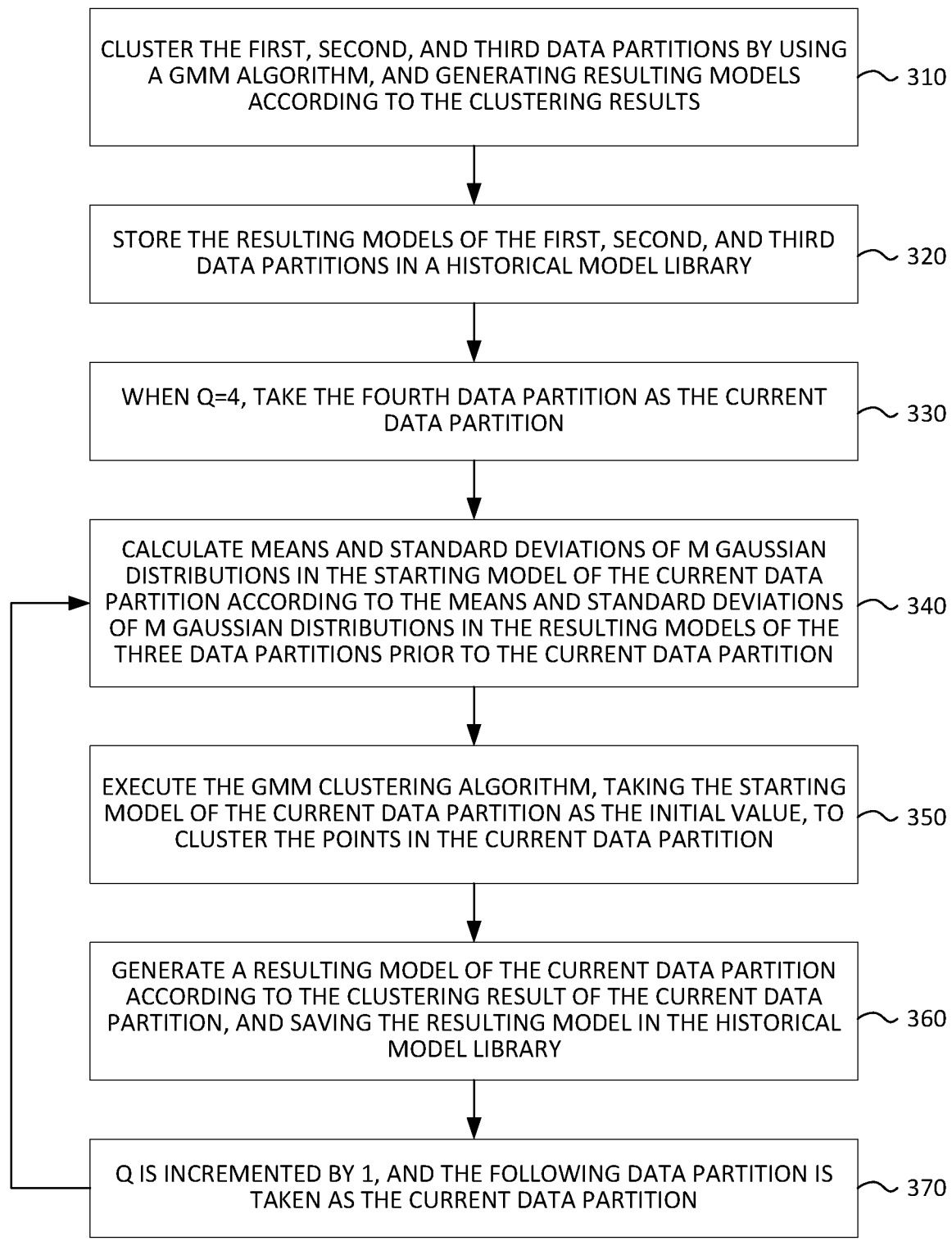
FIG. 3 is a flow chart of an application example for clustering data partitions according to some embodiments of the specification.

The processing flow for clustering each data partition is shown in FIG. 3. The number of categories is set to be M, and for the GMM clustering algorithm, each category is a Gaussian distribution.

Step 310, clustering the first, second, and third data partitions by using a GMM algorithm, and generating resulting models according to the clustering results, wherein each resulting model comprises representative parameters of categories (e.g., means and standard deviations of M Gaussian distributions).

Step 320, storing the resulting models of the first, second, and third data partitions in a historical model library.

Step 330, when Q=4, taking the fourth data partition as the current data partition.

Step 340, calculating means and standard deviations of M gaussian distributions in the starting model of the current data partition according to the means and standard deviations of M gaussian distributions in the resulting models of the three data partitions prior to the current data partition. For example, the step 340 may comprises: reading the resulting models of the three data partitions prior to the current data partition from the historical model library, extracting the means and standard deviations of the M Gaussian distributions, and determining the mean and standard deviation of M Gaussian distributions of the starting model of the current data partition according to Equation 2 and 3:

$$\mu_{Q,t} = \mu_{(Q-1),t}^{pre} + \tfrac{1}{2}\mu_{(Q-2),t}^{pre} + \tfrac{1}{3}\mu_{(Q-3),t}^{pre}, \forall t \in [1,M] \quad \text{Equation 2}$$

$$\sigma_{Q,t} = \sigma_{(Q-1),t}^{pre} + \tfrac{1}{2}\sigma_{(Q-2),t}^{pre} + \tfrac{1}{3}\sigma_{(Q-3),t}^{pre}, \forall t \in [1,M] \quad \text{Equation 3}$$

In Equation 2, $\mu_{Q,t}$ is the mean of the t-th Gaussian distribution in the starting model of pre the Q-th data partition (i.e., the current data partition), and $\mu_{i,t}^{pre}$ is the mean of the t-th Gaussian distribution in the resulting model of the i-th data partition. In Equation 3, $\sigma_{Q,t}$ is the standard deviation of the t-th Gaussian distribution in the starting model of the Q-th data partition, and $\sigma_{(Q-1),t}^{pre}$ is the standard deviation of the t-th Gaussian distribution in the resulting model of the i-th data partition.

Step 350, executing the GMM clustering algorithm, taking the starting model of the current data partition as the initial value of the GMM clustering algorithm, to cluster the points in the current data partition.

Step 360, generating a resulting model of the current data partition according to the clustering result of the current data partition, and saving the resulting model in the historical model library.

Step 370, Q is incremented by 1, and the following data partition is taken as the current data partition, so that the process proceeds to Step 340.

Figure 4:
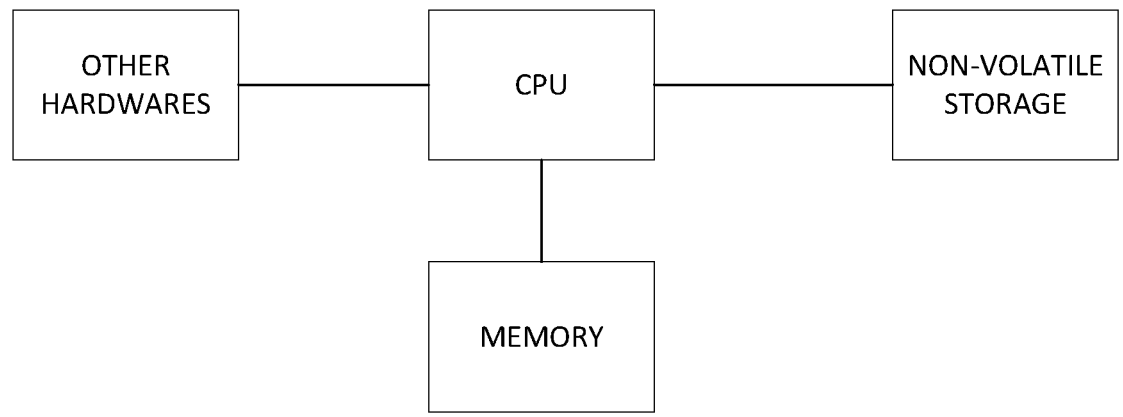
FIG. 4 is a hardware structure diagram of a device for clustering a data stream according to some embodiments of the specification.

Similar to the foregoing flow implementations, embodiments of the specification further provide an apparatus for clustering a data stream. The apparatus may be implemented by software or by hardware or by a combination of hardware and software. Taking the software implementation as an example, as a logical apparatus, the apparatus is achieved by the CPU (Central Process Unit), of the device where it is located, which reads the corresponding computer program instructions into the memory and executes the instructions. At the hardware level, in addition to CPU, memory, and non-volatile storage shown in FIG. 4, the device where the apparatus for clustering a data stream is located may comprise other hardware such as a chip for transmitting and receiving wireless signals, and/or other hardware such as a media board for implementing network communication functions.

Figure 5:
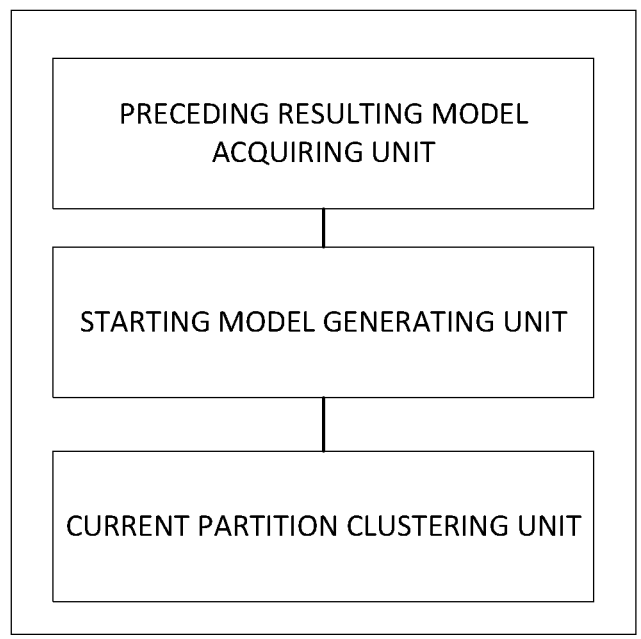
FIG. 5 is a logical structure diagram of an apparatus for clustering a data stream according to some embodiments of the specification.

FIG. 5 is a logical structure diagram of an apparatus for clustering a data stream according to some embodiments of the specification. The data stream comprises a plurality of data partitions having a temporal relationship. The apparatus comprises a preceding resulting model acquiring unit and a starting model generating unit, and a current partition clustering unit, wherein a preceding resulting model acquiring unit is configured for acquiring N resulting models of N preceding data partitions prior to a current data partition, wherein N is a natural number not less than 2, each of the resulting models is generated according to a clustering result of a corresponding preceding data partition, and each of the resulting models comprises representative parameters in different categories; a starting model generating unit is configured for determining a starting model of the current data partition according to the N resulting models, wherein representative parameters in different categories in the starting model are determined based on representative parameters of the same category in the N resulting models; and a current partition clustering unit is configured for clustering data records in the current data partition by using the starting model.

In some embodiments, each representative parameter of each category in the starting model is determined by a weighted sum of the same representative parameters of the same category in the N resulting models.

In some embodiments, the weight of a representative parameter of the same category in the N resulting models is related to the time interval between the preceding data partition corresponding to the resulting model to which the representative parameter belongs and the current data partition. For example, the smaller the time interval is, the higher the weight is.

In some embodiments, the apparatus further comprises a current resulting model generating unit for generating a resulting model of the current data partition according to the clustering result of the current data partition, to be used for clustering the subsequent data partition.

In some embodiments, the clustering of the data stream adopts a k-means clustering algorithm, wherein the representative parameters of a category comprises a location of a central point of the category; or the clustering of the data stream adopts a Gaussian mixture model clustering algorithm, and the representative parameters of a category comprises a mean and standard deviation of the category.

In some embodiments, the clustering of the data stream adopts a clustering algorithm with a non-fixed number of categories; the starting model generating unit comprises: a category combining module for taking each category included in the N resulting models as a category in the starting model.

In some embodiments, the starting model generating unit may further include: a category deleting module for deleting a category from the starting model of the current data partition when a clustering result of a category in at least one preceding data partition satisfies a predetermined deletion condition.

The foregoing descriptions are some embodiments of the specification and are not intended to limit the specification. All modifications, identical replacements and improvements made without departing from the spirit and principle of the specification shall fall within the scope of the specification.

In a typical configuration, the computer device comprises one or more processors (CPU), I/O interfaces, network interfaces and internal memories.

The internal memory may be in the form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, magnetic tape, magnetic disc storage or other magnetic storage devices or any other non-transfer media. The computer storage media may be used to store information that is accessible to computer devices. According to the description in the specification, computer readable media do not include transitory media, such as modulated data signals and carriers.

It should be noted that terms "include," "contain" or any variants of these terms are intended to cover non-exclusive inclusion so that a process, method, product or equipment including a series of elements not only comprises these elements but also comprises other elements not explicitly listed, or also include the elements inherent to such process, method, product or equipment. Unless otherwise with more limitations, the elements described by a sentence "include one . . . " do not exclude that the process, method, product or equipment including the elements also have other same elements.

Those skilled in this art should understand that the embodiments of the specification may be provided as a method, a system or a computer program product. Therefore, the specification may include hardware embodiments, software embodiments or embodiments combining hardware aspects and software aspects. Further, the specification may adopt the form of a computer program product implemented on one or more computer usable storage media (including, but not limited to magnetic disk memory, CD-ROM and optical memory) containing computer usable programs.

The invention claimed is:

1. A computer-implemented method for clustering a data stream, comprising:
   acquiring a plurality of resulting models corresponding to a plurality of preceding data partitions prior to a current data partition in a data stream, wherein the plurality of preceding data partitions and the current data partition in the data stream have a temporal relationship, each of the plurality of resulting models is generated according to a clustering result of a corresponding preceding data partition, each of the plurality of resulting models comprises one or more representative parameters in different categories in the plurality of resulting models, and the current data partition is a data partition to be clustered;
   determining a starting model of the current data partition according to the plurality of resulting models, wherein the starting model comprises one or more representative parameters in different categories determined based on representative parameters of the same category in the plurality of resulting models, and the determining a starting model of the current data partition comprises:
      taking each category included in the plurality of resulting models as a category in the starting model, and deleting a category from the starting model of the current data partition in response to a clustering result with respect to a category in at least one of the plurality of preceding data partitions satisfies a predetermined deletion condition;
   clustering data records in the current data partition by using the starting model to generate a clustering result of the current data partition; and
   generating a resulting model of the current data partition according to the clustering result of the current data partition, for clustering a subsequent data partition in the data stream.

2. The method according to claim 1, wherein determining a starting model of the current data partition according to the plurality of resulting models comprises:
   determining each of the one or more representative parameters of the category in the starting model based on a weighted sum of the representative parameters of the same category in the plurality of resulting models.

3. The method according to claim 2, further comprising:
   determining a weight of one of the representative parameters of the same category in the plurality of resulting models based on a time interval between a preceding data partition corresponding to a resulting model to which the representative parameter belongs and the current data partition,
   wherein the smaller the time interval is, the higher the weight is.

4. The method according to claim 1, wherein clustering data records in the current data partition by using the starting model comprises:
   clustering data records in the current data partition by using the starting model based on a k-means clustering algorithm,
   wherein the one or more representative parameters of the category in the starting model comprise a location of a central point of the category.

5. The method according to claim 1, wherein clustering data records in the current data partition by using the starting model comprises:
   clustering data records in the current data partition by using the starting model based on a Gaussian mixture model clustering algorithm,
   wherein the one or more representative parameters of the category of the starting model comprise a mean and standard deviation of the category.

6. The method according to claim 1, wherein clustering data records in the current data partition by using the starting model comprises:
   clustering data records in the current data partition by using the starting model based on a clustering algorithm with a non-fixed number of categories.

7. An apparatus for clustering a data stream, comprising: one or more processors and one or more non-transitory computer-readable memories coupled to the one or more processors and configured with instructions executable by the one or more processors to cause the apparatus to perform operations comprising:
   acquiring a plurality of resulting models corresponding to a plurality of preceding data partitions prior to a current data partition in a data stream, wherein the plurality of preceding data partitions and the current data partition in the data stream have a temporal relationship, each of the plurality of resulting models is generated according to a clustering result of a corresponding preceding data partition, each of the plurality of resulting models comprises one or more representative parameters in different categories in the plurality of resulting models, and the current data partition is a data partition to be clustered;

determining a starting model of the current data partition according to the plurality of resulting models, wherein the starting model comprises one or more representative parameters in different categories determined based on representative parameters of the same category in the plurality of resulting models, and the determining a starting model of the current data partition comprises:
  taking each category included in the plurality of resulting models as a category in the starting model, and
  deleting a category from the starting model of the current data partition in response to a clustering result with respect to a category in at least one of the plurality of preceding data partitions satisfies a pre-determined deletion condition;
clustering data records in the current data partition by using the starting model to generate a clustering result of the current data partition; and
generating a resulting model of the current data partition according to the clustering result of the current data partition, for clustering a subsequent data partition in the data stream.

8. The apparatus according to claim 7, wherein determining a starting model of the current data partition according to the plurality of resulting models comprises:
  determining each of the one or more representative parameters of the category in the starting model based on a weighted sum of the representative parameters of the same category in the plurality of resulting models.

9. The apparatus according to claim 8, wherein the operations further comprise:
  determining a weight of one of the representative parameters of the same category in the plurality of resulting models based on a time interval between a preceding data partition corresponding to a resulting model to which the representative parameter belongs and the current data partition,
  wherein the smaller the time interval is, the higher the weight is.

10. The apparatus according to claim 7, wherein clustering data records in the current data partition by using the starting model comprises:
  clustering data records in the current data partition by using the starting model based on a k-means clustering algorithm,
  wherein the one or more representative parameters of the category in the starting model comprise a location of a central point of the category.

11. The apparatus according to claim 7, wherein clustering data records in the current data partition by using the starting model comprises:
  clustering data records in the current data partition by using the starting model based on a Gaussian mixture model clustering algorithm,
  wherein the one or more representative parameters of the category of the starting model comprise a mean and standard deviation of the category.

12. The apparatus according to claim 7, wherein clustering data records in the current data partition by using the starting model comprises:
  clustering data records in the current data partition by using the starting model based on a clustering algorithm with a non-fixed number of categories.

13. A non-transitory computer-readable storage medium configured with instructions executable by one or more processors to cause the one or more processors to perform operations comprising:
  acquiring a plurality of resulting models corresponding to a plurality of preceding data partitions prior to a current data partition in a data stream, wherein the plurality of preceding data partitions and the current data partition in the data stream have a temporal relationship, each of the plurality of resulting models is generated according to a clustering result of a corresponding preceding data partition, each of the plurality of resulting models comprises one or more representative parameters in different categories in the plurality of resulting models, and the current data partition is a data partition to be clustered;
  determining a starting model of the current data partition according to the plurality of resulting models, wherein the starting model comprises one or more representative parameters in different categories determined based on representative parameters of the same category in the plurality of resulting models, and the determining a starting model of the current data partition comprises:
    taking each category included in the plurality of resulting models as a category in the starting model, and
    deleting a category from the starting model of the current data partition in response to a clustering result with respect to a category in at least one of the plurality of preceding data partitions satisfies a pre-determined deletion condition;
  clustering data records in the current data partition by using the starting model to generate a clustering result of the current data partition; and
  generating a resulting model of the current data partition according to the clustering result of the current data partition, for clustering a subsequent data partition in the data stream.

14. The non-transitory computer-readable storage medium of claim 13, wherein determining a starting model of the current data partition according to the plurality of resulting models comprises:
  determining each of the one or more representative parameters of the category in the starting model based on a weighted sum of the representative parameters of the same category in the plurality of resulting models.

\* \* \* \* \*